(12) United States Patent
de Salvi et al.

(10) Patent No.: US 12,195,101 B2
(45) Date of Patent: Jan. 14, 2025

(54) SELECTIVELY PIVOTABLE MID-GATE FOR A VEHICLE

(71) Applicant: GM Global Technology Operations LLC, Detroit, MI (US)

(72) Inventors: Daniel Lopez de Salvi, Burbank, CA (US); Carla Pamela Puig, Azusa, CA (US); Lawrence G. Cole, Utica, MI (US); Syed Albeez, Troy, MI (US); Joern Zirfass, Los Angeles, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 293 days.

(21) Appl. No.: 17/962,594

(22) Filed: Oct. 10, 2022

(65) Prior Publication Data

US 2024/0116582 A1 Apr. 11, 2024

(51) Int. Cl.
| | | |
|---|---|---|
| *B62D 33/08* | (2006.01) | |
| *B60J 5/10* | (2006.01) | |
| *B62D 3/02* | (2006.01) | |
| *B62D 47/00* | (2006.01) | |
| *B62D 33/02* | (2006.01) | |

(52) U.S. Cl.
CPC ............ *B62D 47/003* (2013.01); *B62D 33/08* (2013.01); *B60J 5/108* (2013.01); *B62D 33/02* (2013.01)

(58) Field of Classification Search
CPC .... B62D 33/02; B62D 33/0273; B62D 33/08; B62D 47/003; B60J 5/10; B60J 5/108; B60J 5/12; B60J 5/125; B60J 1/1861; B60P 3/423

USPC .......................................... 296/190.11, 26.11
See application file for complete search history.

(56) References Cited

U.S. PATENT DOCUMENTS

| | | | | |
|---|---|---|---|---|
| 2,971,794 A | * | 2/1961 | Garcia | B60P 3/423 |
| | | | | 296/99.1 |
| 4,480,868 A | * | 11/1984 | Koto | B60N 2/3095 |
| | | | | 297/335 |
| 6,260,916 B1 | * | 7/2001 | Hunt | B62D 47/003 |
| | | | | 296/183.1 |
| 6,398,291 B1 | * | 6/2002 | Reusswig | B60N 2/882 |
| | | | | 296/183.1 |
| 6,478,355 B1 | * | 11/2002 | Van Eden | B62D 47/003 |
| | | | | 296/37.6 |
| 6,513,863 B1 | * | 2/2003 | Renke | B60P 3/423 |
| | | | | 296/57.1 |
| 6,550,849 B1 | * | 4/2003 | Dosdall | B62D 33/06 |
| | | | | 296/146.12 |
| 6,786,535 B1 | * | 9/2004 | Grzegorzewski | B60N 2/3013 |
| | | | | 296/37.16 |
| 6,796,600 B1 | * | 9/2004 | Ferer | B60P 3/423 |
| | | | | 296/37.6 |

(Continued)

*Primary Examiner* — Gregory A Blankenship
(74) *Attorney, Agent, or Firm* — CANTOR COLBURN LLP (57) ABSTRACT

A selectively pivotable mid-gate for a vehicle includes a first mid-gate member pivotally mounted to the vehicle through a hinge member and a second mid-gate member is pivotally mounted to the vehicle and the first mid-gate member through the hinge member. A latch system is operatively connected to the first mid-gate member and the second mid-gate member. The latch system is selectively operable to release the first mid-gate member to rotate in a first direction and to release the first mid-gate member and the second mid-gate member to rotate in a second direction that is opposite the first direction.

20 Claims, 9 Drawing Sheets

(56) References Cited

U.S. PATENT DOCUMENTS

| | | | | |
|---|---|---|---|---|
| 6,893,080 | B2* | 5/2005 | Hashimoto | E05B 85/243 292/217 |
| 7,762,621 | B2* | 7/2010 | Duller | B60N 2/3011 296/190.11 |
| 2002/0070582 | A1* | 6/2002 | Pyo | B62D 47/003 296/146.2 |
| 2002/0079715 | A1* | 6/2002 | Hong | B60P 7/135 296/26.11 |
| 2003/0025352 | A1* | 2/2003 | Duffy | B62D 33/03 296/146.1 |
| 2003/0122401 | A1* | 7/2003 | Hashimoto | B62D 25/087 296/190.11 |
| 2004/0232722 | A1* | 11/2004 | Kharod | B60P 3/423 296/146.4 |
| 2004/0239137 | A1* | 12/2004 | Buccinna | B60N 2/305 296/65.09 |
| 2005/0052053 | A1* | 3/2005 | Rhodes | B60N 2/3011 296/183.1 |
| 2006/0076801 | A1* | 4/2006 | Czirmer | B60J 1/1861 296/190.11 |
| 2006/0076802 | A1* | 4/2006 | Voelkert | B60J 1/1861 296/190.11 |
| 2006/0232099 | A1* | 10/2006 | Polewarczyk | B60J 5/00 296/146.1 |
| 2009/0096252 | A1* | 4/2009 | Gordon | B60J 5/103 296/190.11 |
| 2018/0072140 | A1* | 3/2018 | Azzouz | B62D 33/06 |
| 2023/0311724 | A1* | 10/2023 | Grant | B60N 2/305 297/331 |
| 2024/0116582 | A1* | 4/2024 | de Salvi | B60R 21/026 |
| 2024/0140297 | A1* | 5/2024 | Azzouz | B60P 3/423 |

\* cited by examiner

SELECTIVELY PIVOTABLE MID-GATE FOR A VEHICLE

INTRODUCTION

The subject disclosure relates to vehicle mid-gates and, more particularly, to a selectively pivotable mid-gate for a vehicle.

Vehicles, such as pickup trucks include a passenger compartment separated from a cargo bed by a mid-gate. In most cases, the mid-gate is a fixed member that may or may not include a small window including a glass panel that may be opened and closed. In other cases, the entire glass panel may be removed in order to allow items in the cargo bed to extend into the passenger compartment. When removed, the glass panel is often stored against the mid-gate with rear seats in an upright position in order to reduce a possibility of damage.

While removal of the glass panel may accommodate certain objects, such as lumber, other objects such as kayaks, and the like will still not fit in the cargo bed. Accordingly, it is desirable to provide a system that opens more of the mid-gate so as to accommodate larger objects. Further, it is desirable to provide a system in which the glass is stored in a manner that reduces exposure to impacts and possible damage.

SUMMARY

In a non-limiting example, a selectively pivotable mid-gate for a vehicle includes a first mid-gate member pivotally mounted to the vehicle through a hinge member. A second mid-gate member is pivotally mounted to the vehicle and the first mid-gate member through the hinge member. A latch system is operatively connected to the first mid-gate member and the second mid-gate member. The latch system is selectively operable to release the first mid-gate member to rotate in a first direction and to release the first mid-gate member and the second mid-gate member to rotate in a second direction that is opposite the first direction.

In addition to one or more of the features described herein the first mid-gate member includes a first surface and a second surface spaced from the first surface and a glass panel receiving zone disposed between the first surface and the second surface, the glass panel receiving zone being selectively receptive of a glass panel.

In addition to one or more of the features described herein the hinge member comprises a dual-action hinge member including a first hinge member having a first axis of rotation and a second action hinge member having a second axis of rotation.

In addition to one or more of the features described herein the first mid-gate member includes a first side and a second side opposite the first side and the second mid-gate member includes a first mid-gate portion arranged at the first side of the first mid-gate member and a second mid-gate portion arranged at the second side of the first mid-gate member.

In addition to one or more of the features described herein the dual-action hinge member includes a first dual-action hinge member connected at the first side of the first mid-gate member and a second dual-action hinge member connected at the second side of the first mid-gate member.

In addition to one or more of the features described herein each of the first mid-gate portion and the second mid-gate portion includes a first end and a second end that is opposite the first end, the first end of the first mid-gate portion being connected to the first dual-action hinge member and the first end of the second mid-gate portion being pivotally connected to the second dual-action hinge member.

In addition to one or more of the features described herein the latch system includes a first latch mechanism selectively operatively connecting the first mid-gate member with the second mid-gate member and a second latch mechanism selectively connecting the second mid-gate member with the vehicle.

In addition to one or more of the features described herein the first latch mechanism includes a first latch element connecting the first side of the first mid-gate member with the first mid-gate portion of the second mid-gate member and a second latch element connecting the second side of the first mid-gate member with the second mid-gate portion, and the second latch mechanism including a first latch component connecting the first mid-gate portion with the vehicle and a second latch component connecting the second mid-gate portion with the vehicle.

In addition to one or more of the features described herein the first mid-gate member includes a first flange arranged at the first side, and a second flange arranged at the second side, the first mid-gate portion being arranged in the first flange and the second mid-gate portion being arranged in the second flange.

In addition to one or more of the features described herein a bridge panel is pivotally connected to the vehicle adjacent the first mid-gate member, the bridge panel being pivotable with the first mid-gate member.

A vehicle, in accordance with a non-limiting example, includes a body defining a passenger compartment and a cargo bed arranged aft of the passenger compartment and a mid-gate selectively separating the passenger compartment and the cargo bed. The mid-gate includes a first mid-gate member pivotally mounted to the vehicle through a hinge member and a second mid-gate member pivotally mounted to the vehicle and the first mid-gate member through the hinge member. A latch system is operatively connected to the first mid-gate member and the second mid-gate member. The latch system is selectively operable to release the first mid-gate member to rotate in a first direction and to release the first mid-gate member and the second mid-gate member to rotate in a second direction that is opposite the first direction.

In addition to one or more of the features described herein the first mid-gate member includes a first surface and a second surface spaced from the first surface and a glass panel receiving zone disposed between the first surface and the second surface, the glass panel receiving zone being selectively receptive of a glass panel.

In addition to one or more of the features described herein the hinge member comprises a dual-action hinge member including a first hinge member having a first axis of rotation and a second action hinge member having a second axis of rotation.

In addition to one or more of the features described herein the first mid-gate member includes a first side and a second side opposite the first side and the second mid-gate member includes a first mid-gate portion arranged at the first side of the first mid-gate member and a second mid-gate portion arranged at the second side of the first mid-gate member.

In addition to one or more of the features described herein the dual-action hinge member includes a first dual-action hinge member connected at the first side of the first mid-gate member and a second dual-action hinge member connected at the second side of the first mid-gate member.

In addition to one or more of the features described herein each of the first mid-gate portion and the second mid-gate portion includes a first end and a second end that is opposite the first end, the first end of the first mid-gate portion being connected to the first dual-action hinge member and the first end of the second mid-gate portion being pivotally connected to the second dual-action hinge member.

In addition to one or more of the features described herein the latch system includes a first latch mechanism selectively operatively connecting the first mid-gate member with the second mid-gate member and a second latch mechanism selectively connecting the second mid-gate member with the vehicle.

In addition to one or more of the features described herein the first latch mechanism includes a first latch element connecting the first side of the first mid-gate member with the first mid-gate portion of the second mid-gate member and a second latch element connecting the second side of the first mid-gate member with the second mid-gate portion, and the second latch mechanism including a first latch component connecting the first mid-gate portion with the vehicle and a second latch component connecting the second mid-gate portion with the vehicle.

In addition to one or more of the features described herein the first mid-gate member includes a first flange arranged at the first side, and a second flange arranged at the second side, the first mid-gate portion being arranged in the first flange and the second mid-gate portion being arranged in the second flange.

In addition to one or more of the features described herein a bridge panel is pivotally connected to the vehicle adjacent the first mid-gate member, the bridge panel being pivotable with the first mid-gate member.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

Figure 1:
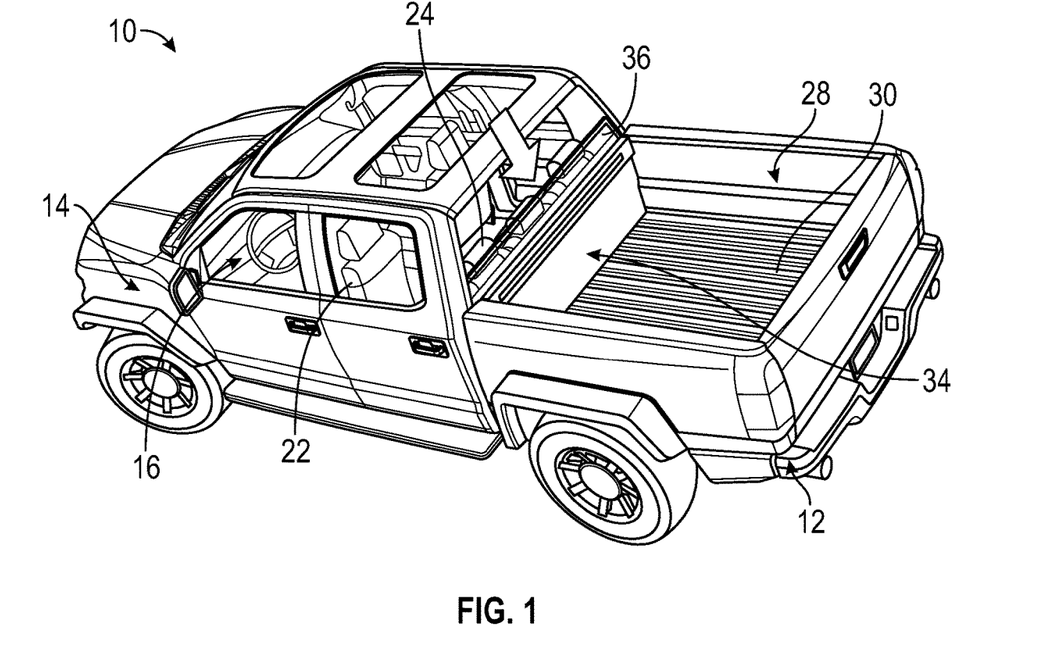
FIG. 1 is an upper right perspective view of a vehicle including a selectively pivotable mid-gate in a first configuration, in accordance with a non-limiting example.

A vehicle, in accordance with a non-limiting example, is indicated generally at 10 in FIG. 1. Vehicle 10 is shown in the form of a pickup truck 12 having a body 14. Body 14 includes a passenger compartment 16 within which are arranged front seats 22 and rear passenger seats 24. Body 14 also includes a cargo bed 28 having a cargo deck 30. Cargo deck 30 includes a recess 32 (FIG. 5) described herein. A selectively pivotable mid-gate 34 includes a glass panel 36 and selectively separates passenger compartment 16 from cargo bed 28. Recess 32 formed in cargo deck 30 is positioned directly adjacent selectively pivotable mid-gate 34.

Figure 2:
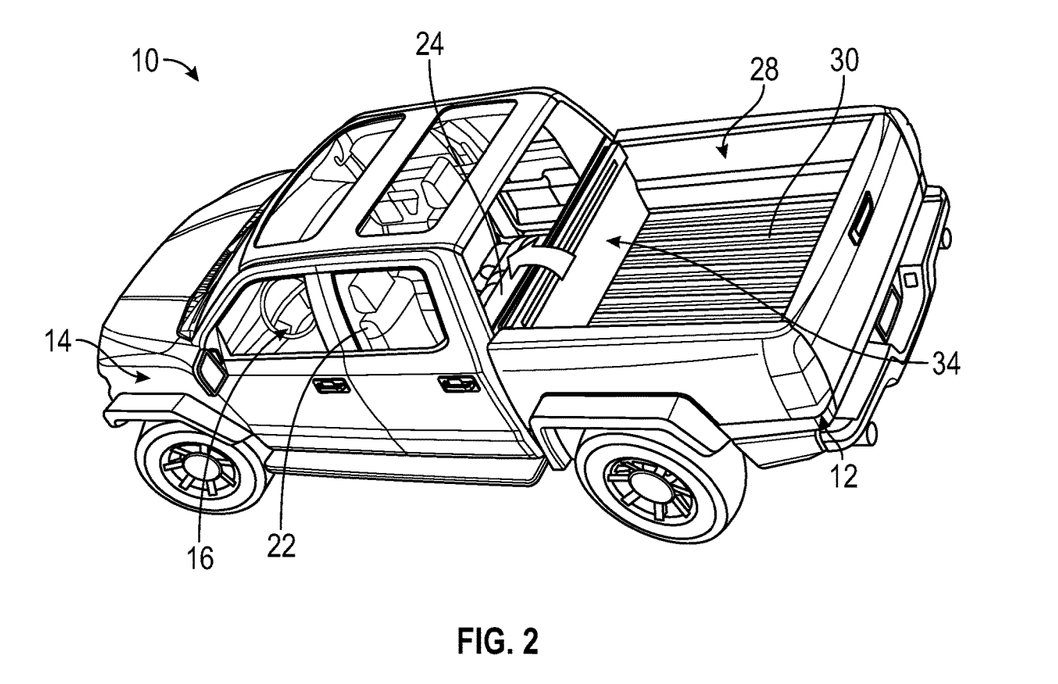
FIG. 2 is an upper right perspective view of a vehicle including a selectively pivotable mid-gate preparing to pivot to a first position, in accordance with a non-limiting example.
Figure 3:
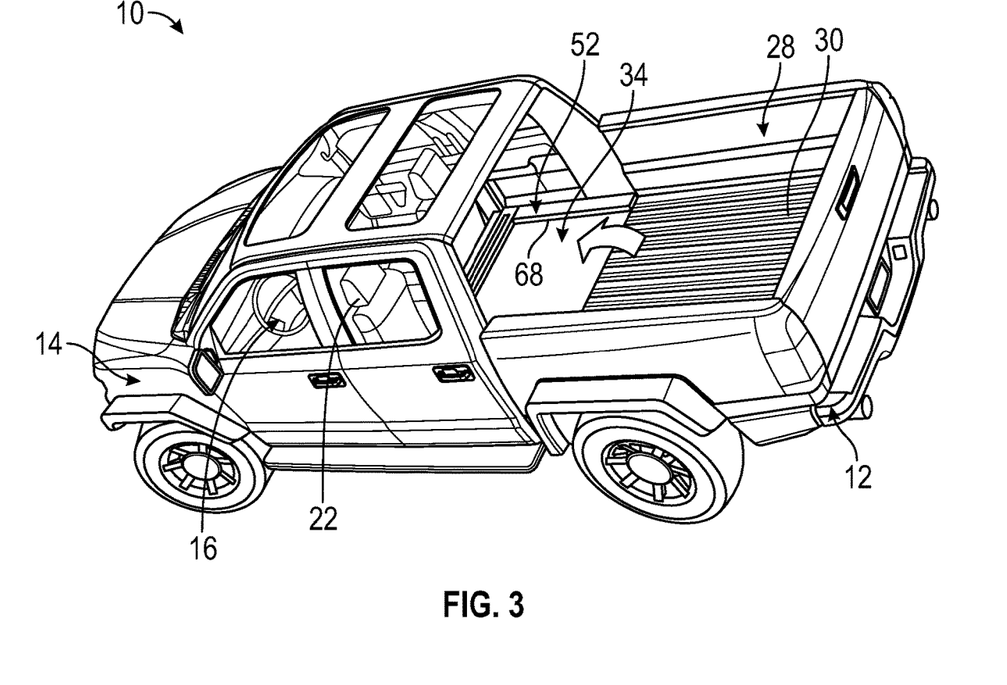
FIG. 3 is an upper right perspective view of a vehicle including a selectively pivotable mid-gate in the first position, in accordance with a non-limiting example.
Figure 4:
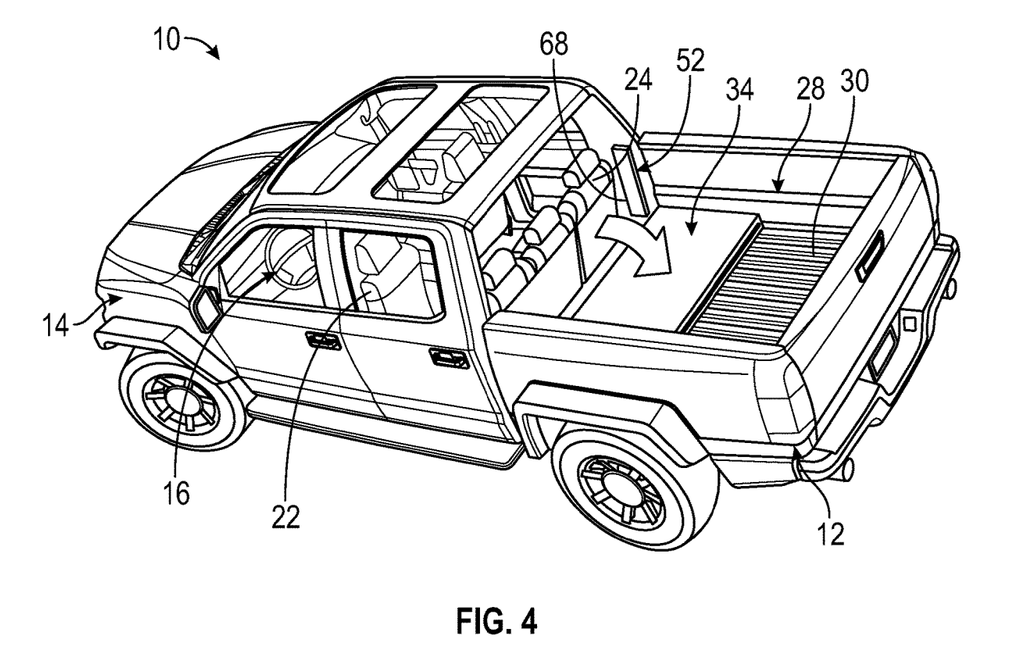
FIG. 4 is an upper right perspective view of a vehicle including a selectively pivotable mid-gate in a second position, in accordance with a non-limiting example.

As will be detailed herein, glass panel 36 may be stowed within mid-gate 34 (FIG. 1), passenger seats 24 folded forward (FIG. 2), and mid-gate 34 pivoted into passenger compartment 16 (FIG. 3) or into cargo bed 28 (FIG. 4). In this manner, mid-gate 34 may be positioned to separate passenger compartment 16 and cargo bed 28 or to connect passenger compartment 16 and cargo bed 28 as desired by a user.

Figure 5:
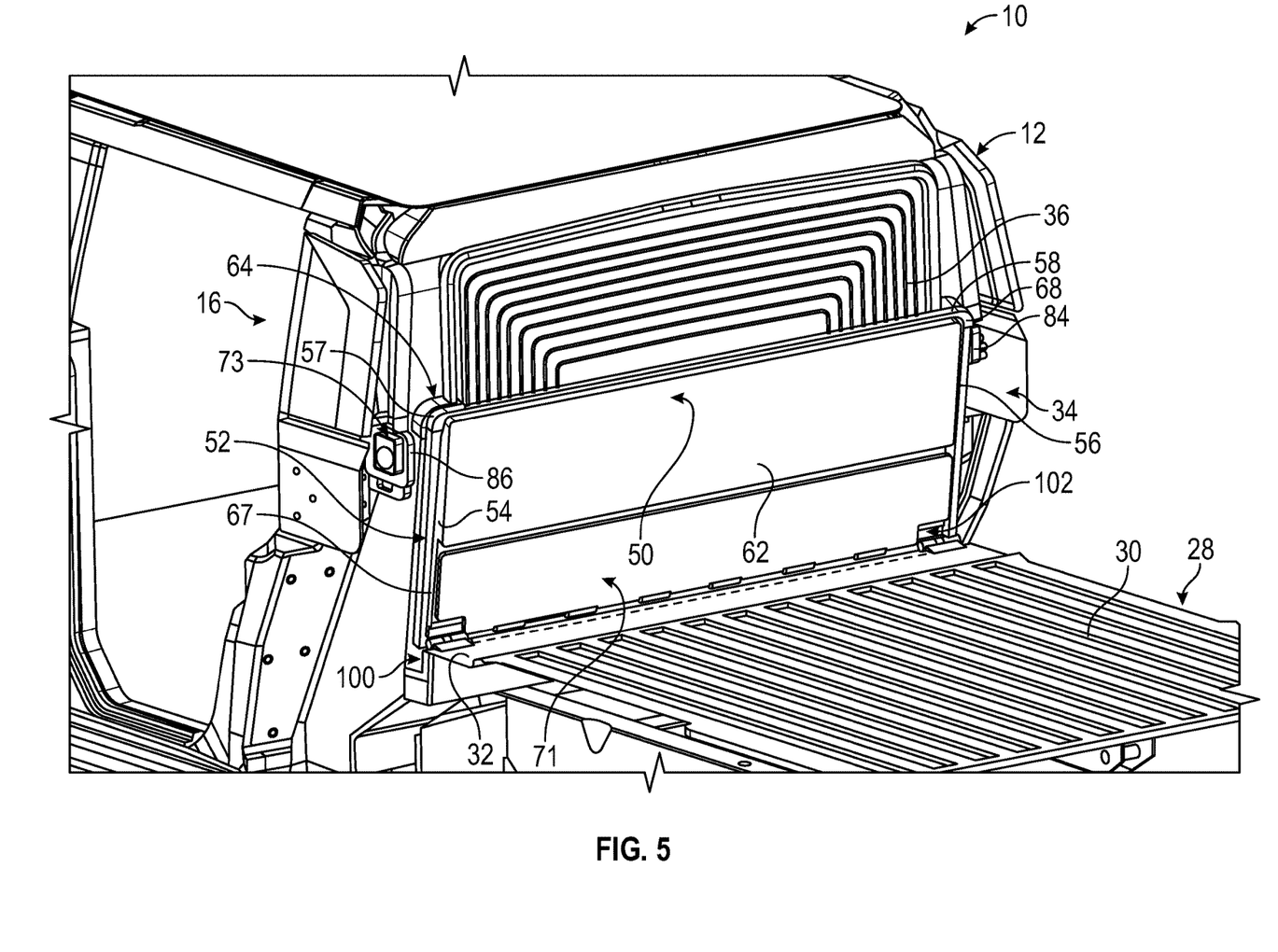
FIG. 5 is a perspective rear view of the mid-gate in the first configuration, in accordance with a non-limiting example.
Figure 6:
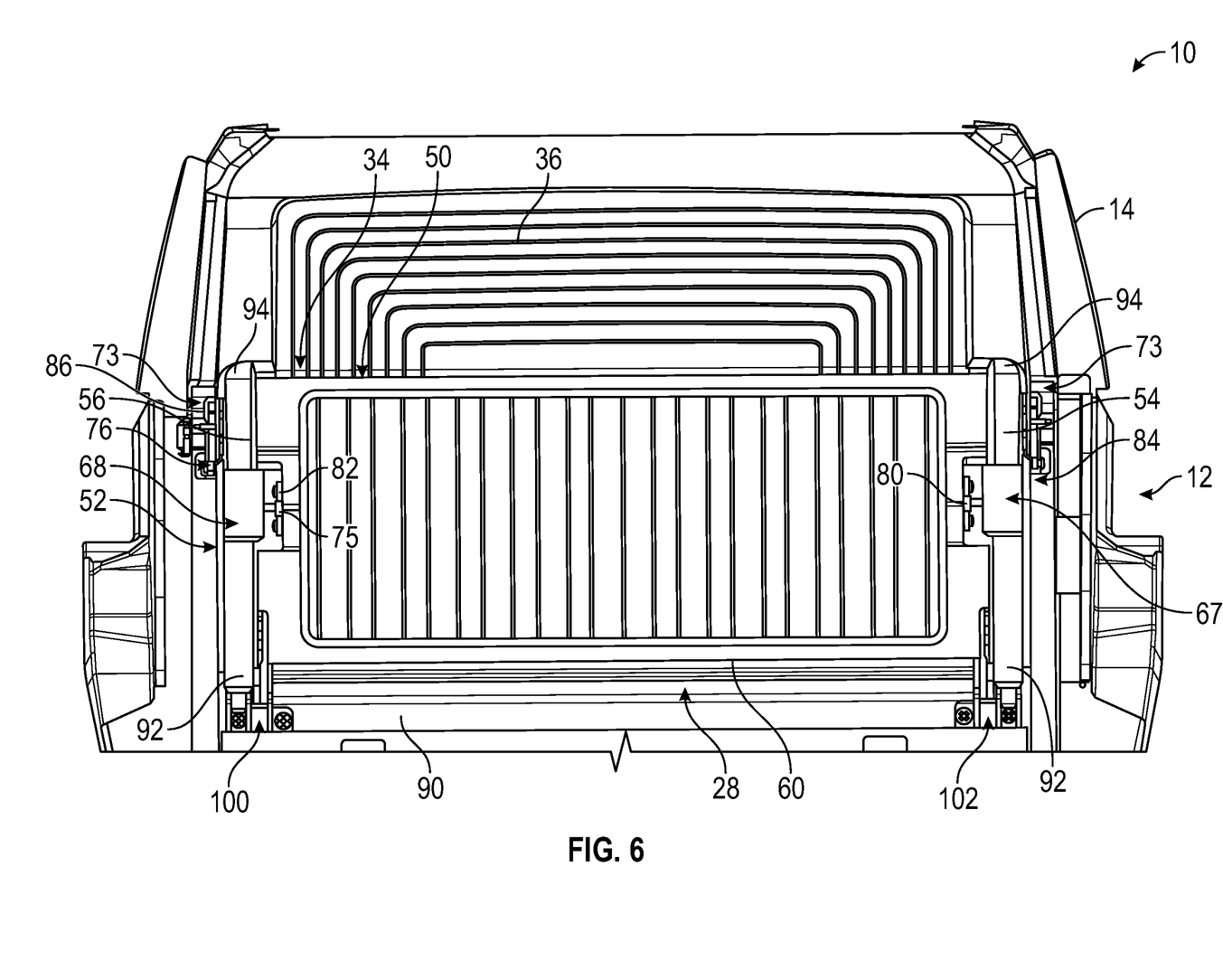
FIG. 6 is a front view of the mid-gate as seen from inside of a passenger compartment of the vehicle, in accordance with a non-limiting example.
Figure 7:
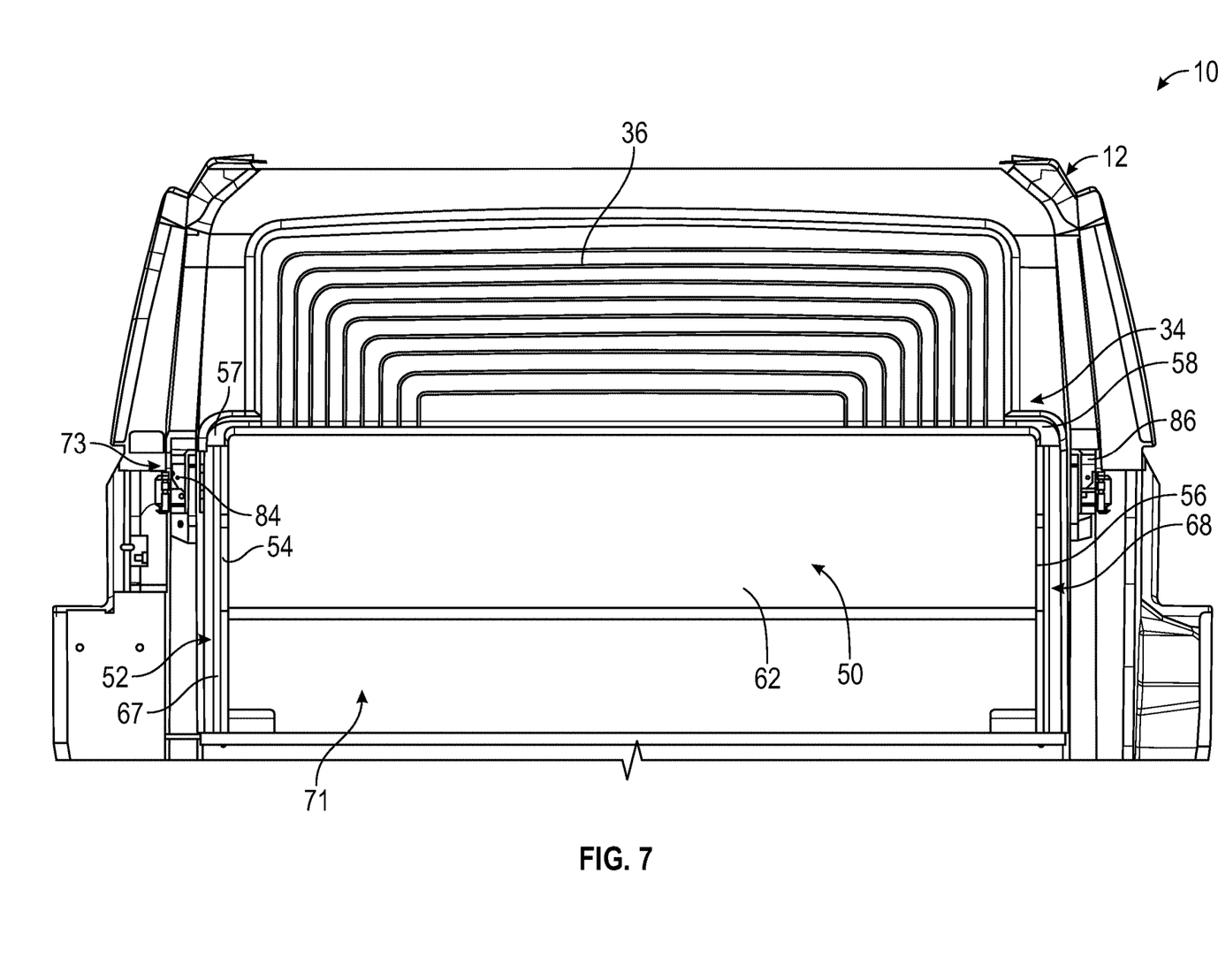
FIG. 7 is a rear view of the mid-gate as seen from a cargo bed of the vehicle, in accordance with a non-limiting example.
Figure 12:
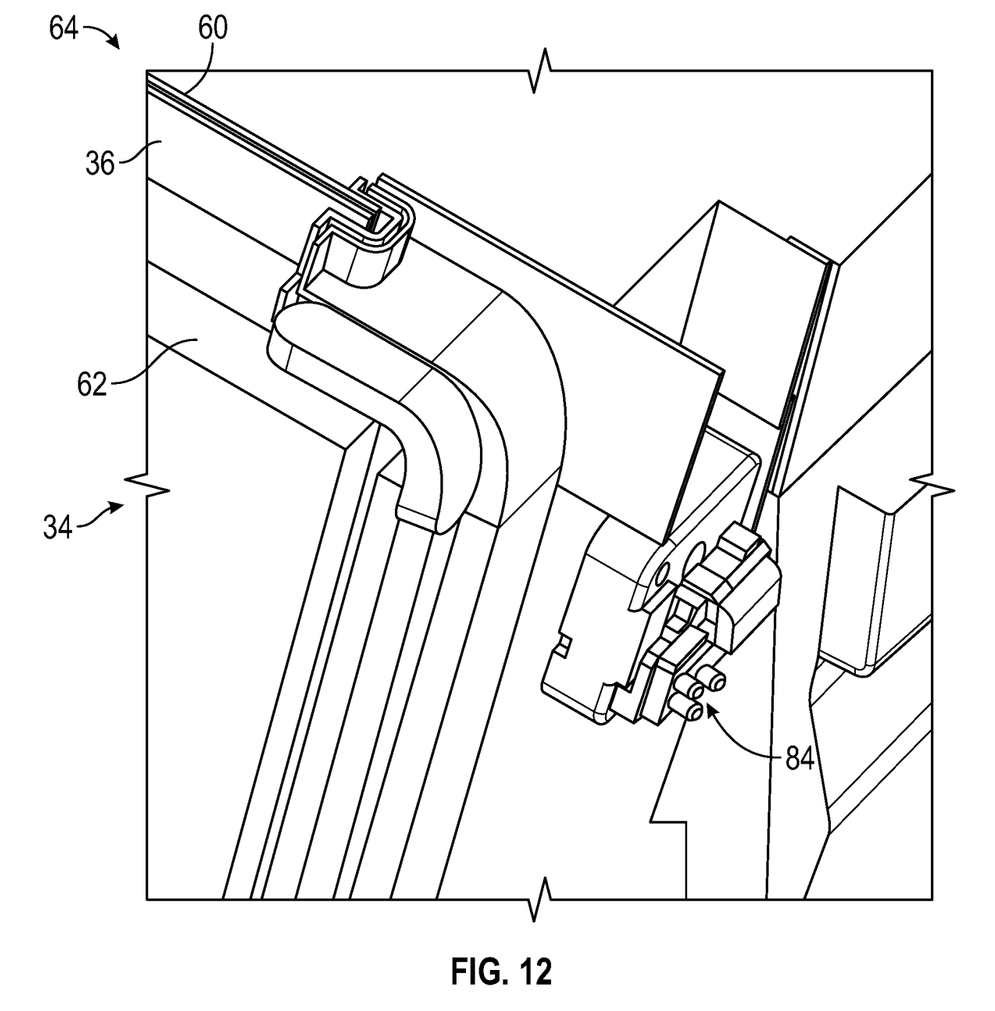
FIG. 12 is a partial perspective view of a glass panel receiving zone in the mid-gate of FIG. 1, in accordance with a non-limiting example.

Reference will now follow to FIGS. 5, 6, and 7 in describing mid-gate 34 in accordance with a non-limiting example. Mid-gate 34 includes two primary components, a first mid-gate member 50 and a second mid-gate member 52. First mid-gate member 50 includes a first side 54 and a second side 56. Second side 56 is laterally spaced from first side 54. First side 54 includes a first flange 57 and second side 56 includes a second flange 58. First mid-gate member 50 also includes a first surface 60 (FIG. 6) defining an interior surface exposed to passenger compartment 16 and a second surface 62 (FIGS. 5 and 7) defining an exterior surface exposed to cargo bed 28. First surface 60 is spaced from second surface 62 by a glass panel receiving zone 64 (FIG. 12). Glass panel 36 may be selectively retracted into glass panel receiving zone 64.

In a non-limiting example, second mid-gate member 52 includes two separate components that cooperate with first mid-gate member 50. Second mid-gate member 52 includes a first mid-gate portion 67 and a second mid-gate portion 68. As shown in FIGS. 6 and 7, first mid-gate portion 67 is arranged at first side 54 and nests against first flange 57 of first mid-gate member 50 and second mid-gate portion 68 is arranged at second side 56 and rests against second flange 58 of first mid-gate member 50. That is, first mid-gate member 50 is arranged between first mid-gate portion 67 and second mid-gate portion 68 of second mid-gate member 52.

Figure 11:
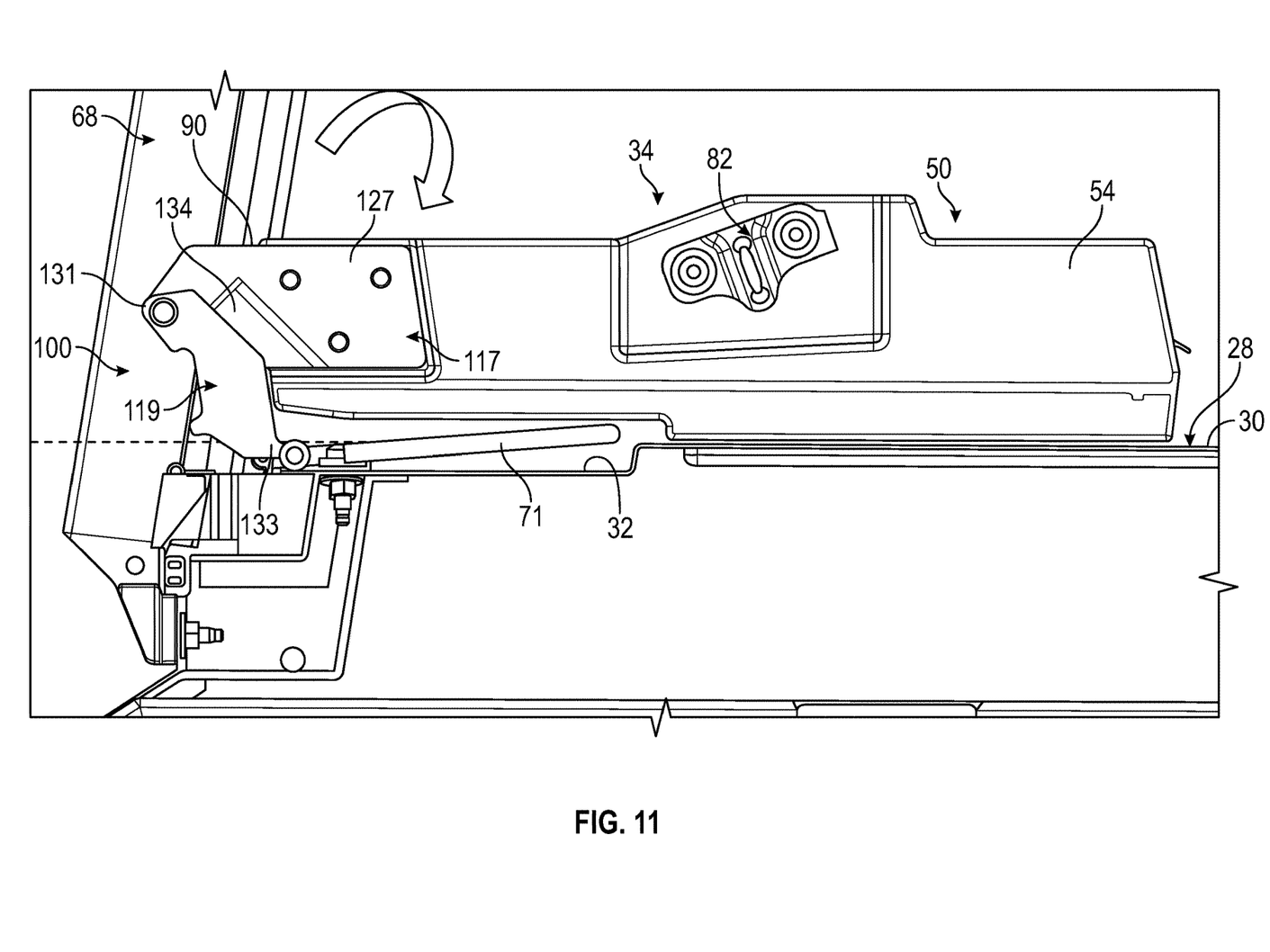
FIG. 11 is a side view of the mid-gate of FIG. 4, in accordance with a non-limiting example.

First mid-gate member 50 may fold forward into passenger compartment 16 together with first and second mid-gate portions 67 and 68 of second mid-gate member 52 as shown in FIG. 3A bridge panel 71 is disposed at second surface 62 of first mid-gate member 50 between first mid-gate portion 67 and second mid-gate portion 68. As shown in FIG. 11, bridge panel 71 selectively nests within recess 32 to cover an interface (not separately labeled) between passenger compartment 16 and cargo bed 28. First mid-gate member 50 may fold rearwardly without second mid-gate member 52 as shown in FIG. 4. With this configuration, mid-gate 34 can accommodate the differing widths of passenger compartment 16 and cargo bed 28.

A latch system 73 selectively restrains mid-gate 34. Referring to FIG. 6, latch system 73 includes a first latch member 75 that selectively secures first mid-gate member 50 to second mid-gate member 52 and a second latch member 76 that secures second mid-gate member 52 to vehicle 10. First latch member 75 includes a first latch element 80 arranged on first side 54 of first mid-gate member 50 and a second latch element 82 arranged on second side 56 of first mid-gate member 50. First latch element 80 connects with first mid-gate portion 67 and second latch element 82 connects with second mid-gate portion 68. Second latch member 76 includes a first latch component 84 connecting first mid-gate portion 67 with vehicle 10 and a second latch component 86 connecting second mid-gate portion 68 to vehicle 10.

In a non-limiting example, first mid-gate member 50 includes a lower edge 90 and each of the first mid-gate portion 67 and the second mid-gate portion 68 includes a first end 92 and a second end 94 as shown in FIG. 6. A dual-action hinge 100 is coupled to first mid-gate member 50 at lower edge 90 and to second mid-gate portion 68 at first end 92 as will be detailed herein. Another dual action hinge 102 is connected to first mid-gate member 50 at lower edge 90 and to first mid-gate portion 67, At this point, it should be understood that the term "dual-action hinge" describes a hinge that may accommodate bi-directional rotation of mid gate 34, (e.g., a forward 90° swing of mid-gate 34 and a rearward 90° swing of mid-gate 34).

Reference will now follow to FIGS. 8, 9, 10, and 11 in describing dual-action hinge 100 with an understanding that dual-action hinge 102 includes corresponding structure. Dual-action hinge 100 includes a fixed member 115, a first hinge member 117 connected to first side 54 of first mid-gate member 50 and a second hinge member 119. First hinge member 117 accommodates rotation of first mid-gate member 50 into passenger compartment 16 as shown in FIG. 3 and second hinge member 119 accommodates rotation of first mid-gate member 50 and second mid-gate portion 57 of second mid-gate member 52 into cargo bed 28 as shown in FIG. 4. Thus, first hinge member 117 includes a first axis of rotation 122 and second hinge member 119 includes a second axis of rotation 124 that is distinct from first axis of rotation 122. At this point, it should be understood that the use of two distinct hinge axes is exemplary and should not be understood to impose limits on the dual-action hinge structure.

Figure 8:
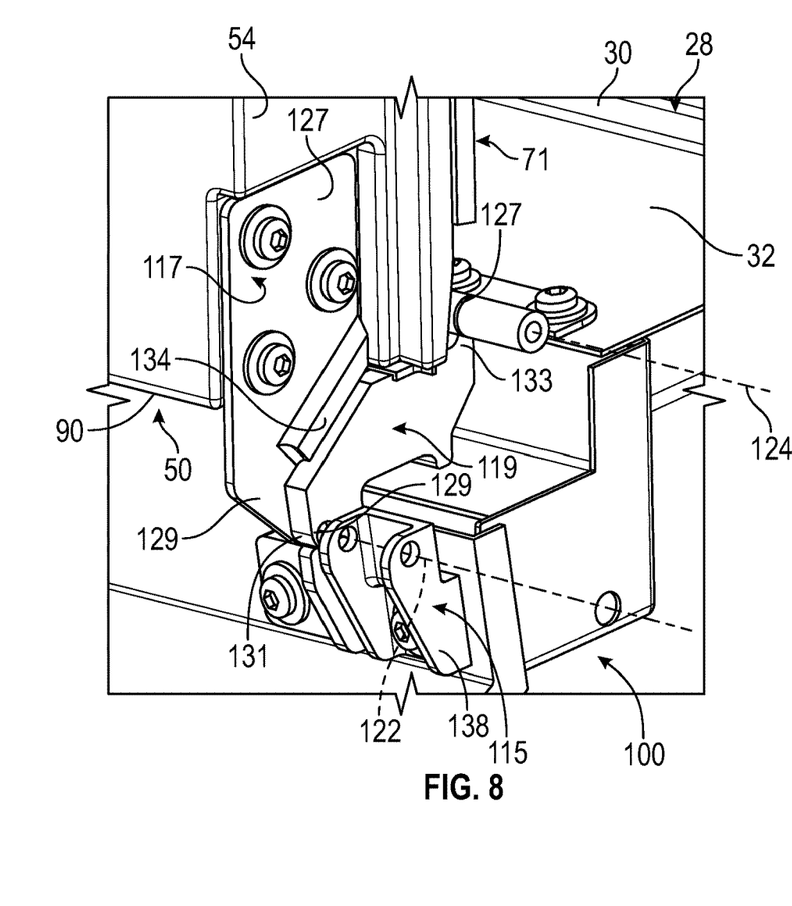
FIG. 8 is a perspective view of a dual-action hinge of the mid-gate of FIG. 5, in accordance with a non-limiting example.
Figure 9:
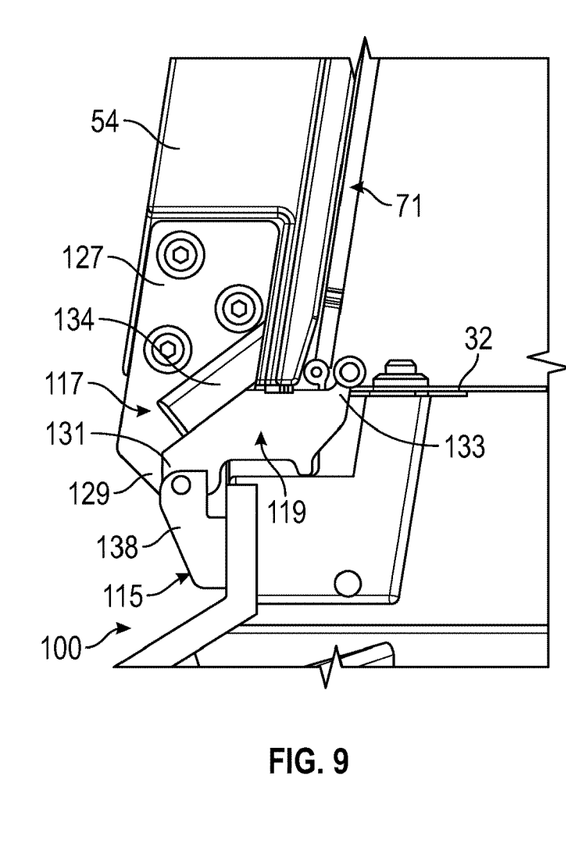
FIG. 9 is a side view of the dual-action hinge of FIG. 8, in accordance with a non-limiting example.

First hinge member 117 includes a first end section 127 connected to first side 54 of first mid-gate member 50 and a second end section 129 that is pivotally connected to fixed member 115 at the first axis of rotation 122. Second hinge member 119 includes a first end portion 131 that rests against fixed member 115 adjacent to second end section 129 of first hinge member 117 and a second end portion 133 that is rotatable about the second axis of rotation 124. First hinge member 117 is also shown to include a travel stop 134 that may rest against second hinge member 119. In addition, fixed member 115 includes a pivot support 138. First end 92 of first mid-gate portion 67 connects to pivot support 138.

Figure 10:
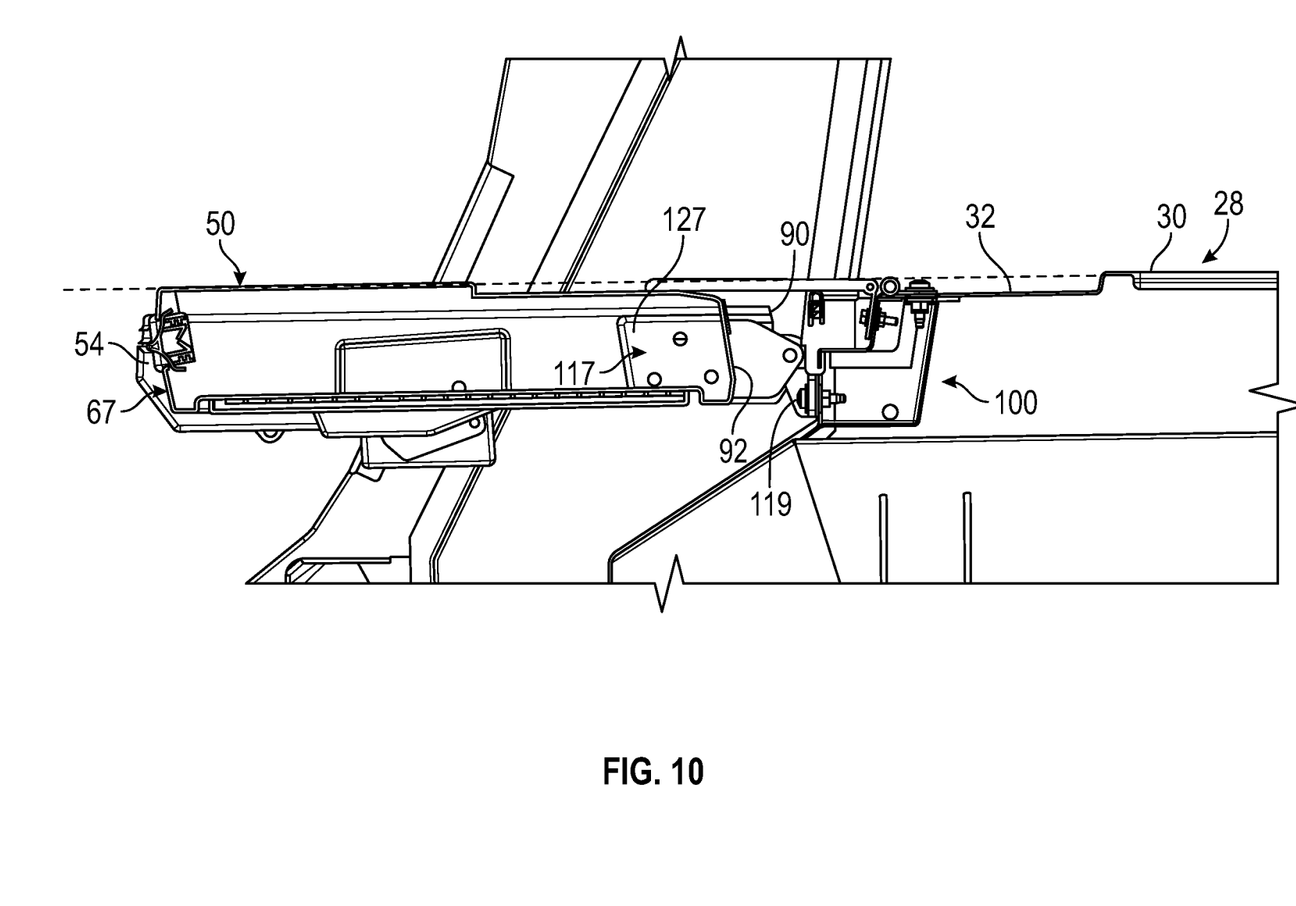
FIG. 10 is a side view of the mid-gate of FIG. 3, in accordance with a non-limiting example.

In accordance with a non-limiting example, when desired to rotate mid-gate 34 forward into passenger compartment 16 as shown in FIGS. 3 and 10, first latch component 84 and second latch component 86 are released. At this point, forward pressure applied to mid-gate 34 causing first and second mid-gate members 50 and 52 to fold into passenger compartment 16. That is, travel stop 134 on first hinge member 117 disengages from second hinge member 119 allowing first mid-gate member 50 and first mid-gate portion 67 of second mid-gate member 52 to rotate about first axis of rotation 122. Second mid-gate portion 68 rotates with the another dual-action hinge 102. With this configuration, first and second flanges 57 and 58 constrain first mid-gate portion 67 and second mid-gate portion 68 to first mid-gate member 50 as mid-gate 34 transitions into passenger compartment 16 as shown in FIGS. 3 and 10.

In accordance with a non-limiting example, when desired to rotate mid-gate 34 rearward into cargo bed 28 as shown in FIG. 4, first latch element 80 and second latch element 82 are released to decouple first mid-gate member 50 from second mid-gate member 52. At this point, rearward pressure applied to mid-gate 34 causing first mid-gate member 50 to rotate rearward lifting second hinge member 119 as shown in FIG. 11. Second hinge member 119 rotates about second axis of rotation 124 shifting first mid-gate member 50 rearwardly into cargo bed 28 as shown in FIG. 4. Second mid-gate member 52 remains stationary. As first mid-gate member 50 rotates against cargo deck 30, bridge panel 71 nests within recess 32 to cover an interface (not separately labeled) between cargo bed 28 and passenger compartment 16.

At this point, it should be appreciated that the vehicle described herein includes a mid-gate that not only stores a rear glass panel but may also be pivoted forward approximately 90° and rearward approximately 90° so as to connect a passenger compartment with a cargo area. This connection will allow for the transport of longer objects without the objects extending into the airstream about the vehicle. The pivotable mid-gate provides more room for car camping, and increase other storage, transport, and outdoor activity uses.

The terms "a" and "an" do not denote a limitation of quantity, but rather denote the presence of at least one of the referenced items. The term "or" means "and/or" unless clearly indicated otherwise by context. Reference throughout the specification to "an aspect" means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical, and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A selectively pivotable mid-gate for a vehicle comprising:
 a first mid-gate member pivotally mounted to the vehicle through a hinge member;
 a second mid-gate member pivotally mounted to the vehicle and the first mid-gate member through the hinge member; and
 a latch system operatively connected to the first mid-gate member and the second mid-gate member, the latch system being selectively operable to release the first mid-gate member to rotate in a first direction and to release the first mid-gate member and the second mid-gate member to rotate in a second direction that is opposite the first direction.

2. The selectively pivotable mid-gate according to claim 1, wherein the first mid-gate member includes a first surface and a second surface spaced from the first surface and a glass panel receiving zone disposed between the first surface and the second surface, the glass panel receiving zone being selectively receptive of a glass panel.

3. The selectively pivotable mid-gate according to claim 1, wherein the hinge member comprises a dual-action hinge member including a first hinge member having a first axis of rotation and a second action hinge member having a second axis of rotation.

4. The selectively pivotable mid-gate according to claim 3, wherein the first mid-gate member includes a first side and a second side opposite the first side and the second mid-gate member includes a first mid-gate portion arranged at the first side of the first mid-gate member and a second mid-gate portion arranged at the second side of the first mid-gate member.

5. The selectively pivotable mid-gate according to claim 4, wherein the dual-action hinge member includes a first dual-action hinge member connected at the first side of the first mid-gate member and a second dual-action hinge member connected at the second side of the first mid-gate member.

6. The selectively pivotable mid-gate according to claim 5, wherein each of the first mid-gate portion and the second mid-gate portion includes a first end and a second end that is opposite the first end, the first end of the first mid-gate portion being connected to the first dual-action hinge member and the first end of the second mid-gate portion being pivotally connected to the second dual-action hinge member.

7. The selectively pivotable mid-gate according to claim 4, wherein the latch system includes a first latch mechanism selectively operatively connecting the first mid-gate member with the second mid-gate member and a second latch mechanism selectively connecting the second mid-gate member with the vehicle.

8. The selectively pivotable mid-gate according to claim 7, wherein the first latch mechanism includes a first latch element connecting the first side of the first mid-gate member with the first mid-gate portion of the second mid-gate member and a second latch element connecting the second side of the first mid-gate member with the second mid-gate portion, and the second latch mechanism including a first latch component connecting the first mid-gate portion with the vehicle and a second latch component connecting the second mid-gate portion with the vehicle.

9. The selectively pivotable mid-gate according to claim 4, wherein the first mid-gate member includes a first flange arranged at the first side, and a second flange arranged at the second side, the first mid-gate portion being arranged in the first flange and the second mid-gate portion being arranged in the second flange.

10. The selectively pivotable mid-gate according to claim 1, further comprising a bridge panel pivotally connected to the vehicle adjacent the first mid-gate member, the bridge panel being pivotable with the first mid-gate member.

11. A vehicle comprising:
 a body defining a passenger compartment and a cargo bed arranged aft of the passenger compartment; and
 a mid-gate selectively separating the passenger compartment and the cargo bed, the mid-gate comprising:
 a first mid-gate member pivotally mounted to the vehicle through a hinge member;
 a second mid-gate member pivotally mounted to the vehicle and the first mid-gate member through the hinge member; and
 a latch system operatively connected to the first mid-gate member and the second mid-gate member, the latch system being selectively operable to release the first mid-gate member to rotate in a first direction and to release the first mid-gate member and the second mid-gate member to rotate in a second direction that is opposite the first direction.

12. The vehicle according to claim 11, wherein the first mid-gate member includes a first surface and a second surface spaced from the first surface and a glass panel receiving zone disposed between the first surface and the second surface, the glass panel receiving zone being selectively receptive of a glass panel.

13. The vehicle according to claim 11, wherein the hinge member comprises a dual-action hinge member including a first hinge member having a first axis of rotation and a second action hinge member having a second axis of rotation.

14. The vehicle according to claim 13, wherein the first mid-gate member includes a first side and a second side opposite the first side and the second mid-gate member includes a first mid-gate portion arranged at the first side of the first mid-gate member and a second mid-gate portion arranged at the second side of the first mid-gate member.

15. The vehicle according to claim 14, wherein the dual-action hinge member includes a first dual-action hinge member connected at the first side of the first mid-gate member and a second dual-action hinge member connected at the second side of the first mid-gate member.

16. The vehicle according to claim 15, wherein each of the first mid-gate portion and the second mid-gate portion includes a first end and a second end that is opposite the first end, the first end of the first mid-gate portion being connected to the first dual-action hinge member and the first end of the second mid-gate portion being pivotally connected to the second dual-action hinge member.

17. The vehicle according to claim 14, wherein the latch system includes a first latch mechanism selectively operatively connecting the first mid-gate member with the second mid-gate member and a second latch mechanism selectively connecting the second mid-gate member with the vehicle.

18. The vehicle according to claim 17, wherein the first latch mechanism includes a first latch element connecting the first side of the first mid-gate member with the first mid-gate portion of the second mid-gate member and a second latch element connecting the second side of the first mid-gate member with the second mid-gate portion, and the second latch mechanism including a first latch component connecting the first mid-gate portion with the vehicle and a second latch component connecting the second mid-gate portion with the vehicle.

19. The vehicle according to claim 14, wherein the first mid-gate member includes a first flange arranged at the first side, and a second flange arranged at the second side, the first mid-gate portion being arranged in the first flange and the second mid-gate portion being arranged in the second flange.

20. The vehicle according to claim 11, further comprising a bridge panel pivotally connected to the vehicle adjacent the first mid-gate member, the bridge panel being pivotable with the first mid-gate member.

* * * * *